3,058,970
Patented Oct. 16, 1962

1

3,058,970
PROCESS FOR THE MANUFACTURE OF OLEFIN POLYMERS
Kurt K. G. Rust, Albert G. M. Gumboldt, Karl Friedrich Hörndler, and Siegfried Sommer, Frankfurt am Main, and Erich Heitzer, Hofheim (Taunus), Germany, assignors, by mesne assignments, to Hercules Powder Company, Incorporated, Wilmington, Del., a corporation of Delaware
No Drawing. Filed Apr. 22, 1958, Ser. No. 730,067
Claims priority, application Germany Apr. 27, 1957
9 Claims. (Cl. 260—93.7)

The present invention relates to a process for the manufacture of olefin polymers.

In Italian Patent No. 526,101, Belgian Patent No. 543,259 and Irish Patent No. 668/55 processes are described for the selective polymerization of α-olefins having at least 3 carbon atoms, particularly of propylene. As catalysts there are used combinations of compounds of the elements of subgroups IV–VI, inclusively uranium and thorium, with organometal compounds of the elements of groups II and III of the periodic table as employed for the polymerization of ethylene by the low pressure process according to Belgian Patents Nos. 533,362, 534,792, and 534,888. In literature said catalysts are frequently called "Ziegler catalysts." Said Ziegler catalysts contain at least part of the compounds of the subgroups in a lower valence than the maximum one and often in two valences. They furthermore contain organometal compounds, complex salts and compounds which are more or less inert.

These new Ziegler catalysts have enabled for the first time high molecular solid and plastic polymers to be obtained from the homologous series of α-olefins, that is from olefins of this series which could not be processed at all by the usual radical chain polymerization under high pressures, or by a polymerization reaction initiated by cations or anions under pressure or at low temperatures, or the resulting liquid or semi-solid polymers had only a relatively low molecular weight.

A typical representative of the aforesaid olefins is propylene which could hitherto be reacted with anions, such as $[BF_3OH]_-$, $[AlCl_4]_-$ to give liquid, highly viscous and branched polymers having molecular weights of about 1500 and which could be polymerized for the first time with the aid of the Ziegler catalysts to form high molecular, plastic-like polypropylene.

In polymerizing olefins of the type $CH_2=CHR$, wherein R is an alkyl or an aryl radical in the presence of the aforesaid catalyst systems is is known that various polymer modifications are obtained which differ largely from one another as to physical properties, such as melting temperature, crystallinity, solubility in organic solvents, tensile strength and stretchability.

In J. Polym. Sci. 16, 143 (1955) G. Natta attributes the occurrence of these polymer modifications which are distinctly different from one another to a possible formation of various steric configurations in the polymers. The polymers of olefins of the type $CH_2=CHR$ contain numerous asymmetric carbon atoms. The substituents R bound to said asymmetric carbon atoms may be arranged along the chain more or less uniformly or they may be arranged in a pure statistic manner. The distribution along the principal chain determines the physical character of the polymers.

The dimensions of the sustituent R in olefins of the type $CH_2=CHR$ hitherto appeared to determine the portion of the various modifications of the resulting polymers. Some of these polymers could be separated by treating them with various solvents of selective activity to obtain the various modifications having a different regularity in structure.

The polymers which are distinguished by a particular

2 steric regularity in structure possess a high tendency to crystallize whereas the other polymer group is largely amorphous.

For the regular arrangement of the asymmetrical carbon atoms Natta has proposed the term "isotactical."

With respect to the course of the polymerization, the working up and the propertie of the polymer products, it is very important to conduct the polymerization of the α-olefins of the type $CH_2=CHR$, particularly of propylene, at a good polymerization rate in a manner such that either a substantially crystalline or an amorphous polymer is obtained. In the field of plastics a substantially crystalline polymer is particularly interesting.

In Belgian Patent No. 543,259, pages 8 and 9, there is exhaustively described that a catalyst prepared by reacting a compound of a metal of subgroups IV–IV of the periodic table, which metal is present in a valence stage higher than that required in order to initiate the polymerization reaction, with an organo-metal compound of groups I–III of the periodic table yields in the polymerization of α-olefins, particularly of propylene, always a mixture of amorphous and crystalline polymers.

There is, furthermore, stated that the portions of crystalline or amorphous polymer can be varied by fractionating a catalyst of this kind into coarsely- or finely dispersed portions, for example by filtration, sedimentation or other methods.

According to the Belgian Patent it is, furthermore, possible to obtain a preponderantly crystalline polymer by using in the polymerization of α-olefins solid crystalline compounds of the metals of subgroups IV–VI of the periodic table, the metals being present in a lower valence stage than the highest one, for example pure crystalline, solid titanium trichloride, titanium dichloride or vanadium trichloride.

In a more recent publication G. Natta, I. Pasguon and E. Giachetti (Angew. Chemie 69, 213 (1957)) state that it is possible partially to polymerize propylene with the Ziegler catalysts, prepared by reacting high valent compounds of the subgroups with metal alkyls, but these catalysts, however, posses a low stereospecificity.

According to Natta said disadvantages does not occur when pure $TiCl_3$ (prepared by an inorganic method) and organo-aluminum compounds, for example aluminum triethyl, are used. With pure titanium trichloride there are obtained according to Natta the polymerization rates indicated in Table 1, column 3.

| Polymerization temperature, °C. | Pressure of propylene, mm. Hg | Consumption of propylene g. per hour and per g. $TiCl_3$ | Starting period, h |
|---|---|---|---|
| 32 | 750 | 1.4 | ~7 |
| 43 | 750 | 2.4 | ~4.4 |
| 56 | 750 | 4.7 | ~2.8 |
| 70 | 750 | 8.3 | ~2 |

A disadvantage of the process recommended by Natta consists in the fact that it is difficult to prepare pure titanium trichloride as required (cf. G. Brauer, Handbuch der präparativen Chemie, page 887). It is, furthermore, disadvantageous that the polymerization rates are relatively low and that undesired starting times occur (last column of Table 1).

Now we have found that a polymer having a high stereospecificity can be prepared from an α-olefin by reacting, prior to the beginning of the polymerization, the components of the Zeigler catalysts at a temperature in the range of from −20 to +40° C., subsequently subjecting the reaction products to a treatment at a temperature ranging from +40 to 150° C. and then carrying out the low pressure polymerization in known manner. The catalysts prepared according to the process of the invention are more active than pure titanium trichloride and they do not require a starting time in the polymerization.

The temperature program indicated above, i.e. preparation of the catalyst at low temperature or room temperature and treating at elevated temperature is essential for the activity of the catalyst system. In case the catalysts are prepared at elevated temperature (with or without annealing at lower or higher temperature) they are rather inert in the reaction. When the catalysts are prepared at a low temperature they are very active but they do not exhibit the particularly elevated stereospecificity of the heat-treated catalysts. Starting periods do not occur.

Natta states that an annealing with organo-aluminum compounds does not influence the polymerization when pure titanium trichloride is used. The effect described above is, therefore, surprising.

The catalysts prepared by the process of the invention are absolutely stable and they can be used even after prolonged suitable storage (several months) without the properties being impaired.

When using the reduced metal compounds described above (for example organically prepared titanium trichloride) as catalyst component, an organo-metal compound must be additionally present, for example an organo-aluminum compound which may contain chlorine, as is the case when using inorganically prepared titanium trichloride as catalyst component.

The process of the invention for the preparation of the catalyst does not necessitate the complicated fractionation of precipitated catalyst into coarsely and finely dispersed fractions as described in Irish Patent No. 668/55.

According to another variant of the process of the invention the catalyst mixture prepared at low temperature is separated by filtration, washed, if desired, with an inert dispersing medium, such as toluene, xylene, cyclohexane, methylcyclohexane, heptane, iso-octane, hydrogenized diesel oils boiling between 180 and 280° C., and the annealing is brought about subsequently. Thus, catalysts are obtained having about the same or a somewhat higher stereospecificity but a greater activity than the catalysts which have not been isolated. When isolating (and washing, if desired) the catalysts, substances retarding the reaction are obviously removed. Similar results can be obtained when the isolation (and washing, if desired) is carried out after the annealing.

A further variant of the process consists in carrying out the annealing in the presence of organo-metal compounds, such as aluminum triethyl, aluminum diethyl monochloride, aluminum ethyl sesquichloride, aluminum monethyl dichloride, aluminum di-isobutyl hydride, etc.

It is likewise possible to carry out the process of the invention in a manner such that the annealing is brought about by a hot washing, for example in toluene, cyclohexane, methylcyclohexane, heptane, iso-octane, hydrogenized diesel oils boiling between 180 and 280° C.

All the aforesaid variants serve to increase the specificity or the activity of the catalyst.

The yields of reduced heavy metal compound, for example titanium trichloride from titanium tetrachloride, are high, generally above 90%.

The heavy metal compound is advantageously reacted with the organo-metal compound in oxygen-free, desulfurized, well dried, olefin-free petroleum diesel oil fractions boiling between 180 and 280° C. The same results can be obtained with aromatic solvents, such as toluene, xylene, diethylbenzene, or alicyclenes, such as cyclohexane, methylcyclohexane, etc. The molar ratio of the heavy metal compound to the organo-metal compound may vary within wide limits, for example between 1:0.2 and 1:12. The ratio also depends on the number of radicals of the organo-metal compound which are bound in an organo-metallic manner; a ratio of 1:0.5 to 1:2 being of advantage.

In the preparation of the catalysts according to the invention the reaction velocity largely depends on the concentration of the reactants and on the temperature. It is the more elevated the higher the concentration and the higher the temperature. The catalyst can be prepared in a molar concentration of 0.1–3 per component of the Ziegler catalyst, a molar concentration of 1 being advantageous.

The temperature at which the catalyst is prepared is very important. In case the heavy metal compound is reacted with the organo-metal compound at higher temperatures, for example at 40–100° C. the reaction takes place at a high velocity but a catalyst thus prepared exhibits a low polymerization rate in the polymerization of α-olefins activated with the organo-metal compound and yields mixtures of amorphous and crystalline polymers. It is, therefore, advantageous to carry out the reaction at temperatures below 40° C., preferably below 20° C. (Cf. U.S. patent application Serial No. 670,632, filed July 9, 1957, for "Process for Polymerizing Lower Olefins.")

When reacting the heavy metal compound with the organo-metal compound, it is either possible initially to charge the reaction vessel with one reactant, for example the titanium tetrachloride, and then to add the other reactant, or both reactants are simultaneouly introduced into the reaction vessel.

In order to obtain a largely or exclusively crystalline polymer by the selective polymerization the thermal treatment of the reaction product of the heavy metal component with the organo-metal component according to the invention is of greatest importance. Said treatment can be carried out either after the reaction, i.e. in the presence of the mother liquor, or advantageously after the elimination of the mother liquor and repeated washing of the catalyst with inert solvents. It is possible, for example, to heat the catalyst suspension in an inert gas atmosphere for a prolonged time while stirring. It is, furthermore, possible to wash out with an inert solvent at elevated temperature. The thermal treatment may be carried out within a temperature range of from about 40 to about 150° C., preferably from 60 to 120° C. The duration and the temperature of the thermal treatment are coupled with one another. A shorter thermal treatment at a higher temperaure gives results similar to a prolonged thermal treatment at lower temperatures.

After the thermal treatment and cooling the catalyst can be used for the polymerization directly or after having been washed out once more with an inert solvent.

The activity of the catalyst prepared by the process of the invention can be further varied by adding compounds, such as diphenyl ether, tetrahydrofurane, dioxane or NaCl, capable of forming complex compounds or double salts with the salts obtained in the course of the reaction of the heavy metal compound with the organo-metal compound. The addition of said compounds can take place either prior to or after the reaction. It is essential to perform the thermal treatment in the presence of these additives.

The polymerization of α-olefins of the type $CH_2=CHR$, particularly of propylene, can be carried out discontinuously or continuously under atmospheric pressure or under slight excess pressure, for example 1–30 atmospheres gage, with a catalyst prepared as described above, while activating by means of an organo-metal compound, preferably of aluminum halogeno-alkyls, in a manner such that the polymerization vessel is first charged with the reduced heavy metal catalyst and the organo-metal compound or one or both components are introduced in the course of the polymerization. The polymerization can be carried out in an inert dispersing medium and/or in the liquid olefin. The polymerization temperature should generally be less than 80° C., for example 15–70° C.

From among the elements of the subgroups there are especially suitable the compounds of titanium and vanadium. Particularly qualified are the halides, such as titanium tetrachloride, owing to the fact that they are easily accessible.

The reduction of the compounds of the elements of the subgroups can be brought about with various organo-metal compounds. Recently organo-aluminum compounds have become accessible in a particularly easy manner. The activation of the reduced compounds of the elements of the subgroups is advantageously performed with organo-aluminum compounds. Particularly suitable are halogen-containing organo-aluminum compounds (cf. patent application Serial No. 670,632 already mentioned), especially monohalogeno-dialkyl aluminum compounds or mixtures containing said compounds, for example aluminum diethyl monochloride. By the process of the invention there can be polymerized monomers, such as propylene, butene, 3-methylbutene-(1), styrene.

The following examples serve to illustrate the invention but they are not intended to limit it thereto.

EXAMPLE 1

A. *Preparation of Catalyst*

In a four-necked flask (capacity 4 l.) 275 cc. (2.5 mols) of distilled titanium tetrachloride are dissolved—while excluding air and moisture—in 575 cc. of an olefin-free diesel oil fraction boiling between 200 and 250° C. The solution is then cooled to $-8°$ C., and there is introduced uniformly and dropwise within 2 hours, while stirring, a solution of 330 cc. (2.75 mols) of aluminum diethyl monochloride in 1320 cc. of hydrogenized diesel oil (boiling point under a pressure of 760 mm. of mercury=200–230° C.). An internal temperature of 0° C. is maintained by cooling. A reddish brown fine precipitate separates. For the after-reaction the mixture is maintained for 4–5 hours at 0° C. and then allowed to stand over night at room temperature. The titration with a solution of a ceric salt shows that 98% of the tetravalent titanium has been reduced to trivalent titanium. The overlaying mother liquor is then decanted and the precipitate is washed three times, each time with 3 l. of the diesel oil fraction. The catalyst suspension is subsequently heated for 2 hours at 90° C., while stirring and carefully excluding atmospheric oxygen and water. After having been cooled to room temperature and having been allowed to sit, the catalyst is washed out three times by decantation and suspension, each time with 2 l. of the diesel oil fraction.

B. *Polymerization*

An enamel vessel (500 l.) preheated to 45° C. and provided with stirrer, jacket heating and gas inlet tube, is charged, with careful exclusion of atmospheric oxygen and water, with 220 l. of an olefin-free diesel oil fraction boiling between 200 and 250° C. Then there are pumped into the vessel, under nitrogen, 5 l. of a 6% solution of aluminum diethyl monochloride in the diesel oil fraction (2.5 mols of aluminum diethyl monochloride) and the whole is stirred for 30 minutes at 45° C. The nitrogen is then replaced by propylene and a propylene pressure of 4.1 atmospheres gage is produced in the vessel. From a reservoir the catalyst suspension (2.48 mols of titanium trichloride) described sub A is then introduced into the vessel under pressure. The polymerization sets in at once. When a pressure as low as 4 atmospheres has been reached propylene is introduced (10 kg. per hour). By cooling the temperature in the vessel is maintained at 50° C. and the propylene pressure at 3.8–4.0 atmospheres gage. After having polymerized for 10 hours the addition of propylene is terminated. After another 2 hours the pressure in the vessel has decreased to 1 atmosphere. After the polymerization has been terminated, the batch is decomposed with 10 l. of butanol and the polymer is washed out on a suction filter with warm dispersing medium. In order to eliminate the dispersing medium completely, the polymer is subjected to a steam distillation. The polymer is then dried at 50–55° C. in a drying closet under reduced pressure and there are obtained 108 kg. of crystalline polypropylene, corresponding to a space-time yield of 40.5 g./l./h. of dispersing medium. The polymer has a melting point of 165–168° C., a bulk weight of 480 g./l.; $\eta$ spec/c.=13.8 (determined at 130° C. in tetrahydronaphthalene of 0.5%).

In order to determine the amorphous or oily portion in the dispersing medium of the polymerization a sample is treated as follows:

The polymer dispersion is filtered with suction, the residue of the diesel oil fraction is well washed out and the mother liquor and the combined washing solutions are evaporated under reduced pressure to dryness. A waxy, rubber-like residue is obtained in an amount of 3%, calculated on the crystalline polypropylene.

After having been molded to give plates (190° C.), the crystalline polypropylene has a tensile strength of 350 kg./cm.$^2$, a breaking strength of 400 kg./cm$^2$, an elongation of 800% and a ball pressure hardness of 680 kg./cm.$^2$.

EXAMPLE 2

A. *Preparation of Catalyst*

A four-necked flask (capacity 2 l.) is charged, with exclusion of air and water, with 82.5 cc. of titanium tetrachloride (0.75 mol) and 172.5 cc. of diesel oil fraction and into the mixture there is introduced dropwise at 0° C., while stirring, within 2 hours, a solution of 99 cc. of aluminum diethyl monochloride (0.82 mol) in 396 cc. of the diesel oil fraction. After an after-reaction of about 4 hours at 0° C. the mixture is allowed to stand for 10 hours at room temperature and is then heated for 2 hours at 90° C., while stirring and passing through nitrogen. After having been allowed to cool, the catalyst is used for the polymerization. A titration with a solution of ceric salt shows that 99% of the tetravalent titanium has been reduced to trivalent titanium.

B. *Polymerization*

A 40 l. polymerization vessel is charged with 22.5 l. of diesel oil fraction and the air is removed by scavenging with nitrogen. Then there is added a solution of 60 cc. of aluminum diethyl monochloride in 1940 cc. of a diesel oil fraction and the whole is stirred for 30 minutes at 45° C. under nitrogen. Subsequently there are added 0.25 mol of titanium trichloride prepared as described sub A and propylene is then introduced.

In the polymerization vessel a temperature of 45–50° C. is maintained by cooling. The supply of propylene is regulated so that the pressure in the vessel does not exceed 1 atmosphere gage. The average pressure amounts to 0.9 atmosphere gage. After the batch has been polymerized for 12 hours, the polymerization is interrupted and the reaction product is worked up as described in Example 1. 6.7 kg. of solid polypropylene are obtained which correspond to a space-time yield of 22.2 g./l. of dispersing medium per hour. $\eta$ spec/c. of the polymer=7.5. Molded plates from this polymer are distinguished by outstanding hardness. The polymerization mother liquor and the washing mother liquor contain 2.8% of amorphous product, calculated on the solid polypropylene.

EXAMPLE 3

A. *Preparation of Catalyst*

The catalyst is prepared as described in Example 1.

After having washed out the catalyst 146 g. of anhydrous, finely dispersed sodium chloride, dried in the high vacuum are introduced, while stirring, and the suspension is heated for 2 hours at 90° C. in an atmosphere of nitrogen. After cooling the catalyst is washed three times, each time with 2 l. of hydrogenized diesel oil (boiling point 200–230° C. under a pressure of 760 mm. of mercury).

B. Polymerization

The polymerization is carried out in a 500 l. enamel vessel under the same conditions and with the same amount of activator as described in Example 1B. After having polymerized for 10 hours, there are obtained 90 kg. of crystalline polypropylene ($\eta$ spec/c.=15.5, determined at 130° C. in a 0.5% solution of tetrahydronaphthalene). The dispersing medium contains 4.5% of amorphous product, calculated on the solid polymer.

EXAMPLE 4

A. *Preparation of Catalyst*

A 2 l. four-necked flask is charged, with exclusion of air and moisture, with 82.5 cc. of titanium tetrachloride (0.75 mol) and 172.5 cc. of diesel oil fraction and to the mixture there are added dropwise within 2 hours at 0° C., while stirring, a solution of 99 cc. of aluminum diethyl monochloride (0.82 mol) in 396 cc. of diesel oil fraction. After an after-reaction of about 4 hours at 0° C. and after having been allowed to stand for 10 hours at room temperature, another 99 cc. of aluminum diethyl chloride are cautiously added to the mixture and the whole is then heated for 2 hours at 90° C. After cooling, the catalyst can be employed for the polymerization.

B. *Polymerization*

The polymerization is carried out as described in Example 2B in a 40 l. vessel under a pressure of 1 atmosphere gage and at a temperature of 45° C. There are used as activator 250 millimols of TiCl$_3$ and 30 cc. of aluminum diethyl monochloride (250 millimols). After having polymerized for 10 hours there are obtained 5 kg. of crystalline polypropylene ($\eta$ spec/c.=8.3) which correspond to a yield of 6.8 g. of polymer per hour and g. of TiCl$_3$ under normal pressure. The mother liquor contains 6% of soluble polypropylene, calculated on the solid polymer.

EXAMPLE 5

A 300 l. vessel provided with a stirrer is charged under nitrogen with 5.5 l., corresponding to 50 mols, of the purest distilled titanium tetrachloride and 60 l. of degassed hydrocarbon (petroleum fraction boiling between 200 and 250° C.) freed from oxygen, sulfur compounds and olefins, and the mixture is cooled to 0–10° C. Then there are introduced dropwise in the course of 3 hours 110 mols of ethyl aluminum sesquichloride dissolved in the above-mentionted petroleum fraction (280–300 g./l.). The temperature is maintained at $-2-+1°$ C. by means of a cooling pipe. When the supply of the ethyl aluminum sesquichloride is terminated, the relation mixture is stirred at $-2-0°$ C. for further 6 hours and the precipitate formed is then separated from the reaction mother liquor by a candle filter aggregate (candle filter connected in series). The precipitate is subsequently washed three times at room temperature, each time with 50 l. of the petroleum fraction. The precipitate is suspended in 150 l. of the petroleum fraction, the candle filter is washed twice with 20 l. of the petroleum fraction and there are obtained 160 kg. of a titanium trichloride suspension about 0.23 molar which corresponds to a yield of about 93%, calculated on the titanium tetrachloride used. All operations are carried out with careful exclusion of atmospheric oxygen.

The catalyst is tested for the polymerization in two forms (*a*) Unannealed,
(*b*) Annealed.

(*a*) The polymerization with the unannealed catalyst is carried out under the following conditions: Pure distilled propylene, 1700 l. of petroleum fraction, 20 millimols/l. of catalyst (altogether 5.2 g. of TiCl$_3$), activator 40 millimols/l. of aluminum diethyl monochloride dissolved in 250 l. of petroleum fraction. Temperature: 50° C., dropwise addition of the activator solution: 3 hours, polymerization period: 6 hours under normal pressure.

Space-time yield: 29.4 g./l. of dispersing medium/h., 87.5% of crystalline polypropylene, 6.3% of amorphous polypropylene and 6.2% of oily polypropylene.

(*b*) The catalyst dispersion obtained as described above is stirred under pure nitrogen for 3 hours at 100° C., the dispersion is suction-filtered and washed twice at room temperature, each time with the same volume of the petroleum fraction and suspended in the same volume of dispersing medium. When using the catalyst dispersion thus treated for the polymerization under the same conditions as indicated sub (*a*) the following results are obtained:

Space-time yield: 51.5 g./l. of dispersing medium/h., 95.2% of crystalline polypropylene, 2.5% of amorphous polypropylene, anad 2.3% of oily polypropylene.

EXAMPLE 6

An autoclave is charged with 80 l. of hydrogenized diesel oil and 0.3 mol of aluminum diethyl chloride and 80 l. of liquid propylene are added under pressure. The mixture is then heated to 57° C. and 0.1 mol of TiCl$_3$ (15.3 g.)—prepared as described in Example 2—suspended in diesel oil is pumped in. The polymerization starts at once. At the beginning of the polymerization the pressure amounts to 15.7 atmospheres gage. In the course of 2 hours further 0.8 mol of aluminum diethyl chloride are pumped in. Within 11½ hours the pressure falls from 15.7 atmospheres gage to 2.8 atmospheres gage. The average pressure consequently amounts to 9.3 atmospheres gage (10.3 atmospheres absolute). By cooling a polymerization temperature of 57° C. is maintained. The polymerization is interrupted after 11½ hours and the residual monomer is blown off for recovery. The mixture is worked up as described in the preceding examples. There are obtained 31 kg. of crystalline product and 3 kg. of amorphous product.

EXAMPLE 7

The polymerization is carried out as described in Example 6, but at a temperature of 40° C. As compared with Example 6 double the amount of titanium trichloride is used. In the course of 20 hours the pressure falls from 10.8 to 0.5 atmospheres gage. The average pressure consequently amounts to 5.7 atmospheres gage (6.7 atmospheres absolute). There are obtained 34 kg. of crystalline product and 1 kg. of amorphous product.

The crystalline product has a high molecular weight and is especially valuable for use in industry as regards the tensile strength, hardness, and elongation.

In the following table there are given the results of Examples 1–7. The indicated values of the polymerization rate are calculated on 1 g. of titanium trichloride and on a pressure of 760 mm. of mercury. The conversion into said units is easy since, according to Natta, the polmerization rate is directly proportional to the amount of titanium trichloride and the propylene pressure used at a given temperature.

| Example: | Polymerization temperature | Consumption of propylene in g/h and g. of TiCl$_3$ under 760 mm. of mercury | Starting time, hours |
|---|---|---|---|
| 1 | 50 | 5.0 | 0 |
| 2 | 47.5 | 8.0 | 0 |
| 3 | 50 | 5.0 | 0 |
| 4 | 45 | 6.8 | 0 |
| 5b | 50 | 19.0 | 0 |
| 6 | 57 | 17.0 | 0 |
| 7 | 40 | 8.3 | 0 |
| pure titanium trichloride extrapolated from the table in column 2 (value of Natta) | 40 | 2.1 | about 5.3 |
| | 45 | 2.6 | about 4.2 |
| | 50 | 3.6 | about 3.6 |
| | 56 | 4.7 | about 2.8 |

The results of the above table show that the catalysts prepared by the process of the invention are much more active than pure titanium trichloride and that there are no starting times as is the case with pure titanium trichloride. Natta has described that by a further operation, i.e. by pulverizing pure titanium trichloride, the starting time can be suppressed. By this operation, however, the catalysts do not become more active.

We claim:
1. The process of polymerizing a 1-olefin which comprises contacting said olefin in an inert organic diluent with a catalyst produced by mixing, in an inert liquid organic diluent, a dialkylaluminum monohalide with titanium tetrachloride in a molar ratio of from about 0.3:1 to about 2:1 at a temperature of from about −20° C. to about 15° C., holding the reaction mixture at said temperature for a substantial length of time, then heating the insoluble reaction product so obtained to a temperature of from about 60° C. to about 100° C. and activating said insoluble reaction product with a dialkylaluminum halide.

2. The process of polymerizing a 1-olefin which comprises contacting said olefin in an inert organic diluent with a catalyst produced by mixing, in an inert liquid organic diluent, a dialkylaluminum monohalide with titanium tetrachloride in a molar ratio of from about 0.3:1 to about 2:1 at a temperature of from about −20° C. to about 15° C., holding the reaction mixture at said temperature for a substantial length of time, then heating the insoluble reaction product so obtained to a temperature of from about 40° C. to about 150° C. and activating said insoluble reaction product with a dialkylaluminum halide.

3. The process of claim 2 wherein the insoluble reaction product is separated from the diluent and soluble products after the heat treatment and then is washed with fresh diluent.

4. The process of claim 2 wherein the insoluble reaction product is separated from the diluent and soluble by-products, washed with fresh diluent, and then resuspended in fresh diluent, after aging at low temperature and prior to the heat treatment.

5. The process of claim 2 wherein the dialkylaluminum monohalide is diethylaluminum chloride.

6. The process of claim 2 wherein the dialkylaluminum monohalide is employed in the form of a mixture of dialkylaluminum monohalide with alkylaluminum dihalide.

7. The process of claim 2 wherein the 1-olefin is propylene.

8. The process of preparing a solid catalyst component for the polymerization of 1-olefin which comprises mixing in an inert liquid organic diluent a dialkylaluminum monohalide with titanium tetrachloride in a molar ratio of from about 0.3:1 to about 2:1 at a temperature of from about −20 to about +15° C., holding the reaction mixture at said temperature for a substantial length of time, and then heating the insoluble reaction product so obtained to a temperature of from about 40° C. to about 150° C.

9. The process of claim 8 wherein the dialkylaluminum monohalide is employed in the form of a mixture of dialkylaluminum halide with alkylaluminum dihalide.

References Cited in the file of this patent

UNITED STATES PATENTS

| | | |
|---|---|---|
| 2,843,577 | Friedlander et al. | July 15, 1958 |
| 2,905,645 | Anderson et al. | Sept. 22, 1959 |

FOREIGN PATENTS

| | | |
|---|---|---|
| 546,846 | Belgium | Apr. 7, 1956 |
| 789,781 | Great Britain | Jan. 29, 1958 |

UNITED STATES PATENT OFFICE
CERTIFICATE OF CORRECTION

Patent No. 3,058,970                         October 16, 1962

Kurt K. G. Rust et al.

It is hereby certified that error appears in the above numbered patent requiring correction and that the said Letters Patent should read as corrected below.

Column 1, line 49, for "is", first occurrence, read -- it --; column 2, line 7, for "propertie" read -- properties --; line 42, for "disadvantages" read -- disadvantage --; column 6, line 58, for "22.2" read -- 22.3 --; column 8, in the table, first column, line 11 thereof, for "value" read -- values --; column 10, line 14, for "1-olefin" read -- 1-olefins --.

Signed and sealed this 26th day of March 1963.

(SEAL)
Attest:

ESTON G. JOHNSON                         DAVID L. LADD
Attesting Officer                            Commissioner of Patents